US012563363B2

(12) United States Patent (10) Patent No.: US 12,563,363 B2
Garner et al. (45) Date of Patent: Feb. 24, 2026

(54) MAP GENERATOR FOR MAP-BASED DEVICE MANAGEMENT

(71) Applicant: ROKU, INC., San Jose, CA (US)

(72) Inventors: Gregory M. Garner, Key Colony Beach, FL (US); David Stern, Los Gatos, CA (US); Anthony Wood, Palo Alto, CA (US)

(73) Assignee: ROKU, INC., San Jose, CA (US)

( * ) Notice: Subject to any disclaimer, the term of this patent is extended or adjusted under 35 U.S.C. 154(b) by 269 days.

(21) Appl. No.: 18/141,120

(22) Filed: Apr. 28, 2023

(65) Prior Publication Data

US 2024/0365083 A1 Oct. 31, 2024

(51) Int. Cl.
*H04W 4/00* (2018.01)
*H04W 4/02* (2018.01)
*H04W 4/029* (2018.01)

(52) U.S. Cl.
CPC ........... *H04W 4/023* (2013.01); *H04W 4/029* (2018.02)

(58) Field of Classification Search
CPC .............................. H04W 4/023; H04W 4/029
See application file for complete search history.

(56) References Cited

U.S. PATENT DOCUMENTS

2018/0020329 A1* 1/2018 Smith ...................... H04W 4/08
2023/0012619 A1* 1/2023 Hildebrant ........... G01C 21/206
2024/0310527 A1* 9/2024 Tucker .................. G01S 17/894

FOREIGN PATENT DOCUMENTS

CN 115705349 A * 2/2023

OTHER PUBLICATIONS

European Patent Office, "Extended European Search Report," for EP patent application No. 24172417.8, Sep. 11, 2024, 10 pages.
Haus et al., "Feasibility Study of Autonomous Drone-based IoT Device Management in Indoor Environments," Mobile Airground Edge Computing, Systems, Networks, and Applications, ACM, 2 Penn Plaza, Suite 701 New York, Aug. 14, 2019, 7 pages.

* cited by examiner

*Primary Examiner* — Erika A Washington
(74) *Attorney, Agent, or Firm* — STERNE, KESSLER, GOLDSTEIN & FOX P.L.L.C.

(57) ABSTRACT

Disclosed are system, method and/or computer program products for generating a map for map-based management of a plurality of Internet of Things (IoT) devices. An embodiment obtains first data associated with a mobile device, including data indicative of a relative position of the mobile device with respect to one or more subsets of the plurality of IoT devices at different points in time, and/or second data from each of one or more of the plurality of IoT devices, including data indicative of a relative position of each of the one or more IoT devices with respect to a subset of other IoT devices in the plurality of IoT devices, generates, based on at least the first and/or second data, a map in which each of the IoT devices is assigned a corresponding location, and provides the map to an application that enables map-based management of the plurality of IoT devices.

25 Claims, 9 Drawing Sheets

500

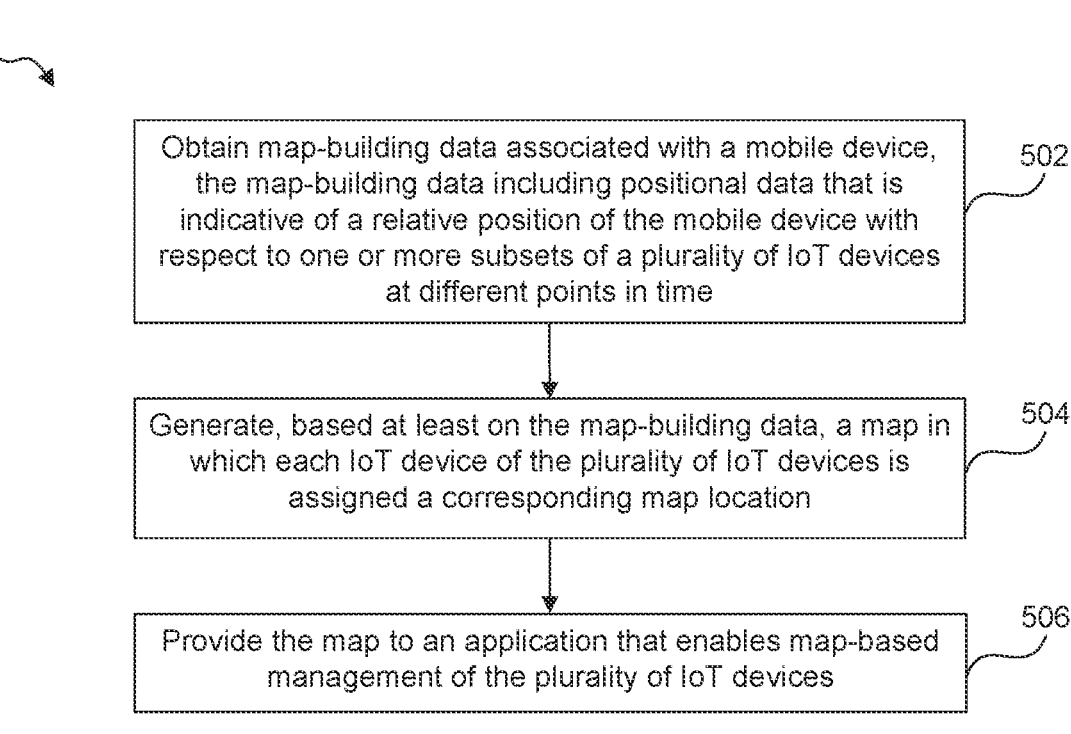

Obtain map-building data associated with a mobile device, the map-building data including positional data that is indicative of a relative position of the mobile device with respect to one or more subsets of a plurality of IoT devices at different points in time   502

Generate, based at least on the map-building data, a map in which each IoT device of the plurality of IoT devices is assigned a corresponding map location   504

Provide the map to an application that enables map-based management of the plurality of IoT devices   506

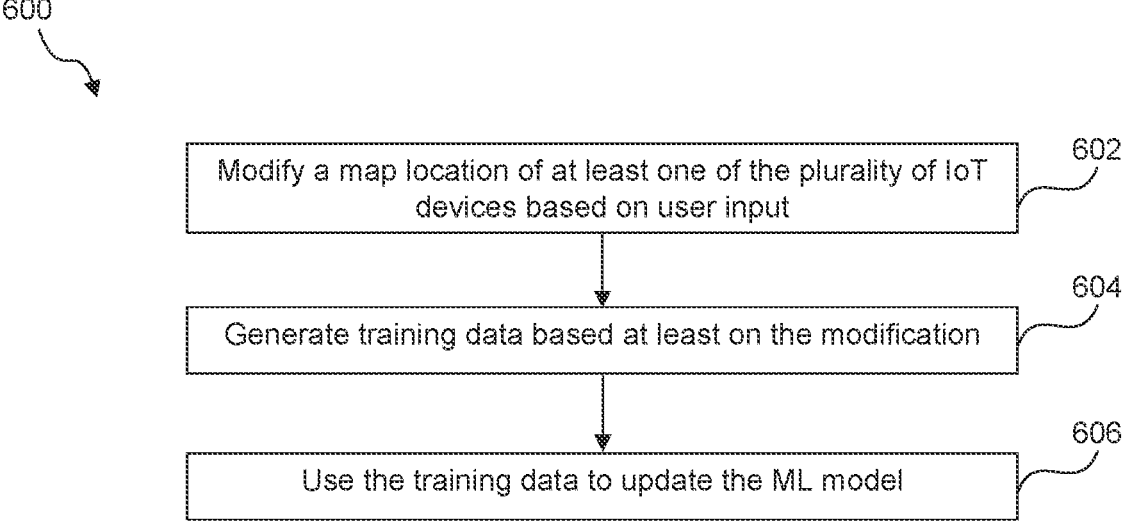

Modify a map location of at least one of the plurality of IoT devices based on user input   602

Generate training data based at least on the modification   604

Use the training data to update the ML model   606

FIG. 6

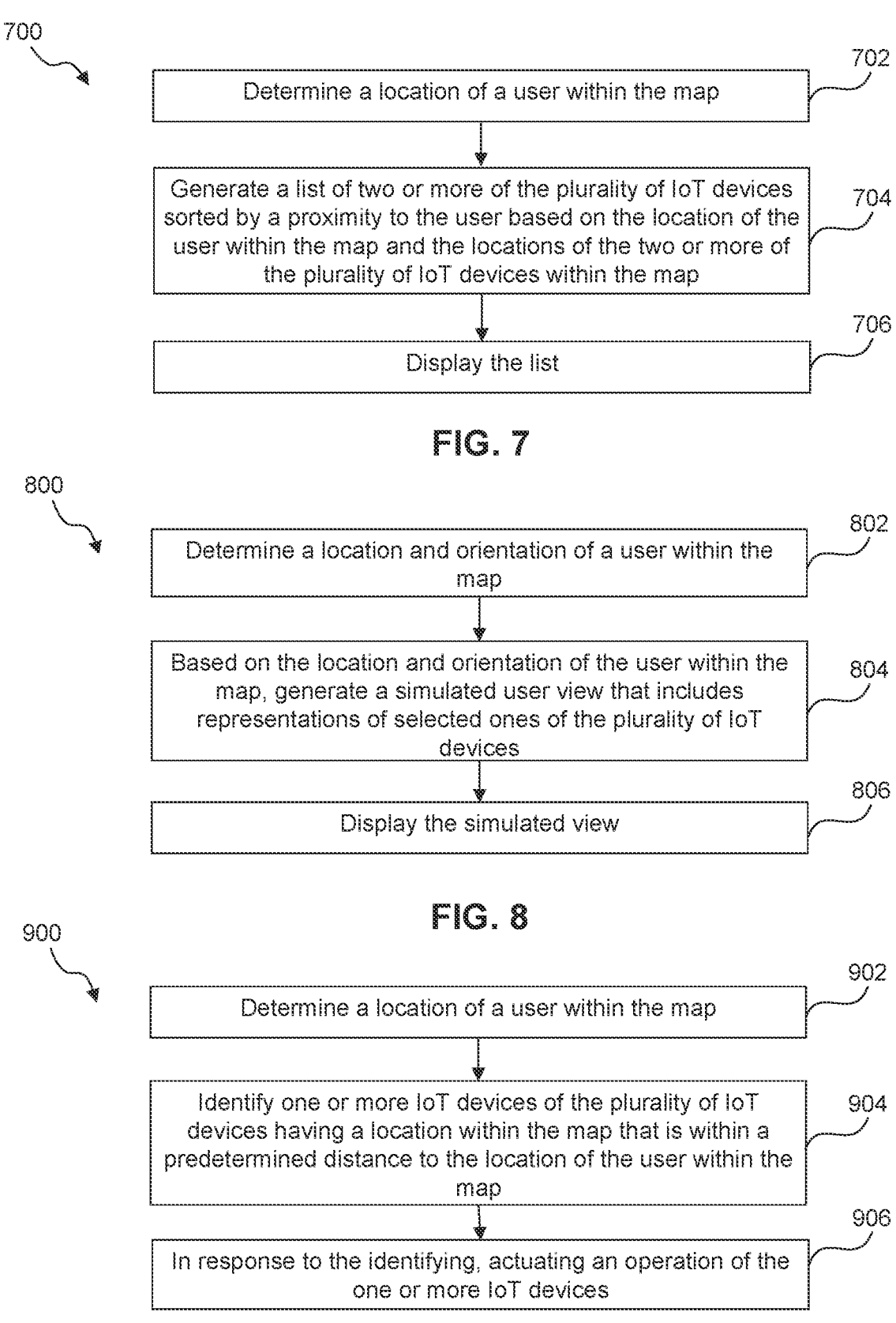

700

702

Determine a location of a user within the map

704

Generate a list of two or more of the plurality of IoT devices sorted by a proximity to the user based on the location of the user within the map and the locations of the two or more of the plurality of IoT devices within the map

706

Display the list

Determine a location and orientation of a user within the map

804

Based on the location and orientation of the user within the map, generate a simulated user view that includes representations of selected ones of the plurality of IoT devices

806

Display the simulated view

Determine a location of a user within the map

904

Identify one or more IoT devices of the plurality of IoT devices having a location within the map that is within a predetermined distance to the location of the user within the map

906

In response to the identifying, actuating an operation of the one or more IoT devices

FIG. 9

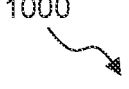
1000
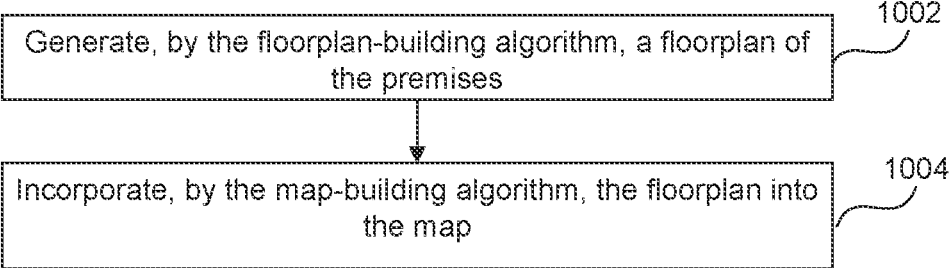
| Generate, by the floorplan-building algorithm, a floorplan of the premises | 1002 |
| Incorporate, by the map-building algorithm, the floorplan into the map | 1004 |
FIG. 10
1100
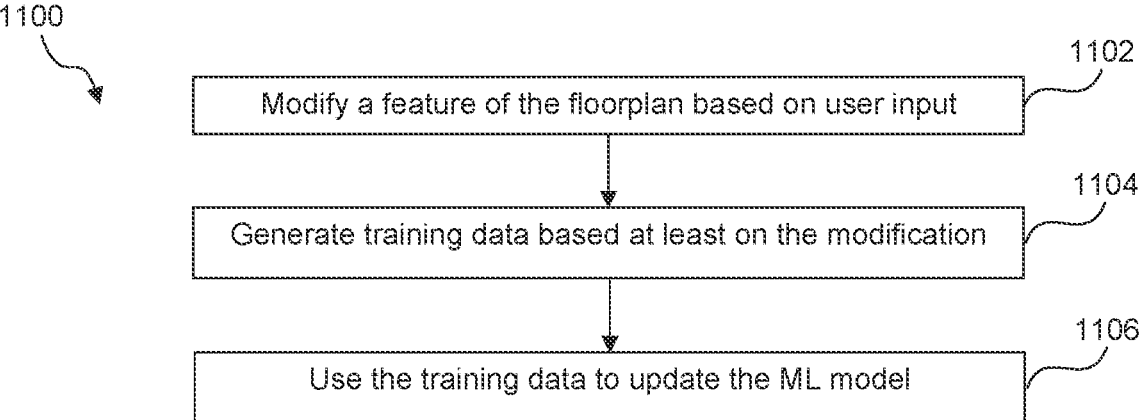
| Modify a feature of the floorplan based on user input | 1102 |
| Generate training data based at least on the modification | 1104 |
| Use the training data to update the ML model | 1106 |
FIG. 11

1200

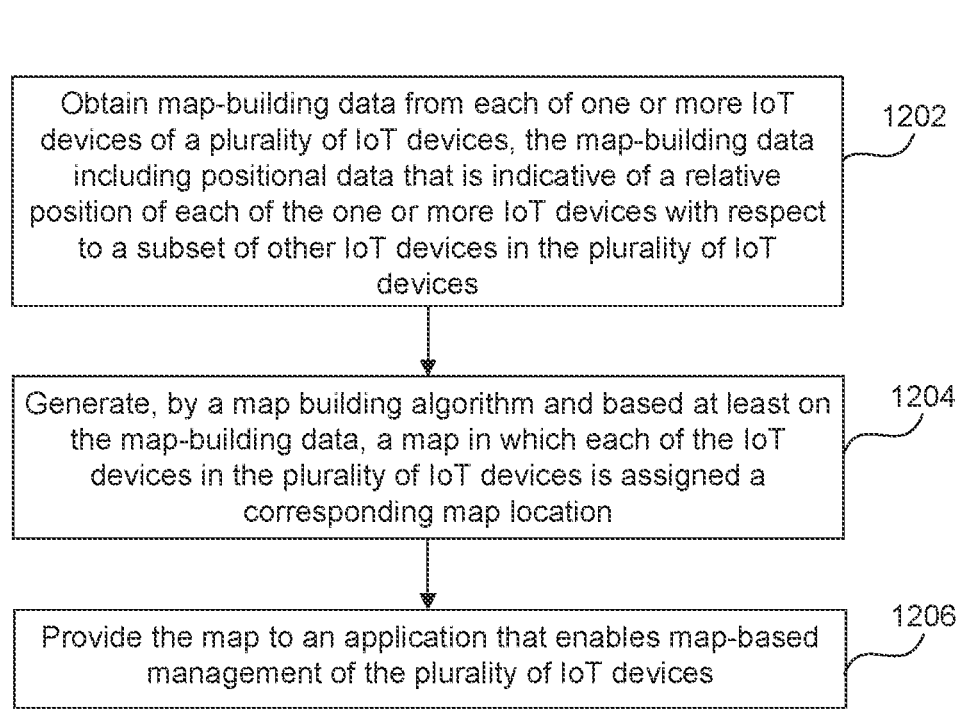

Obtain map-building data from each of one or more IoT devices of a plurality of IoT devices, the map-building data including positional data that is indicative of a relative position of each of the one or more IoT devices with respect to a subset of other IoT devices in the plurality of IoT devices    1202

Generate, by a map building algorithm and based at least on the map-building data, a map in which each of the IoT devices in the plurality of IoT devices is assigned a corresponding map location    1204

Provide the map to an application that enables map-based management of the plurality of IoT devices    1206

FIG. 12

MAP GENERATOR FOR MAP-BASED DEVICE MANAGEMENT

BACKGROUND

Field

This disclosure is generally directed to device management, and more particularly to automatically generating a map of devices, such as Internet of Things (IoT) devices, to enable map-based management thereof.

Background

Modern living and working spaces, such as homes, hotels, or offices, are increasingly equipped with many devices that are configured to engage in digital communications. These devices may range from traditional internet-connected devices such as personal computers, telephone systems, security systems, gaming systems, and over-the-top (OTT) streaming media players, to newer devices including "smart home" devices such as connected appliances, utilities, lights, switches, power outlets, and speakers, as well as wearable devices such as watches and/or health monitors, among countless other examples. These devices may generally be referred to as "Internet of Things" (IoT) devices.

Applications exist that enable users to control IoT devices installed on a premises, such as a home or office. Conventional IoT device control applications typically identify IoT devices by name and may enable the user to sort those devices by name or date added. However, in a scenario in which there are a large number of IoT devices (e.g., a large number of smart lightbulbs in a relatively small area), trying to individually control each one of those IoT devices using such an application can be difficult and confusing. For example, a user may know which IoT device he/she wants to control, but he/she may not recall the specific name that was assigned to the device or the date it was added and thus cannot easily identify it within the application.

SUMMARY

Provided herein are system, apparatus, article of manufacture, method and/or computer program product embodiments, and/or combinations and sub-combinations thereof, for generating a map that may be used to enable map-based management of a plurality of Internet of Things (IoT) devices. An example embodiment obtains first map-building data associated with a mobile device, the first map-building data including first positional data indicative of a relative position of the mobile device with respect to one or more subsets of the plurality of IoT devices at different points in time, and/or second map-building data from each of one or more IoT devices of the plurality of IoT devices, the second map-building data including second positional data indicative of a relative position of each of the one or more IoT devices with respect to a subset of other IoT devices in the plurality of IoT devices. The example embodiment generates, based on at least the first map-building data and/or the second map-building data, a map in which each IoT device of the plurality of IoT devices is assigned a corresponding map location. The example embodiment provides the map to an application that enables map-based management of the plurality of IoT devices.

BRIEF DESCRIPTION OF THE FIGURES

The accompanying drawings are incorporated herein and form a part of the specification.

FIG. 5 illustrates a flow diagram of a method for enabling map-based management of a plurality of IoT devices, according to some embodiments.

FIG. 6 illustrates a flow diagram of a method for updating a machine learning (ML) model for generating a map of IoT devices, according to some embodiments.

FIG. 7 illustrates a flow diagram of a method for using a map of IoT devices to generate a list of the IoT devices sorted by proximity to a user, according to some embodiments.

FIG. 8 illustrates a flow diagram of a method for using a map of IoT devices to generate a simulated user view that includes representations of selected ones of the IoT devices, according to some embodiments.

FIG. 9 illustrates a flow diagram of a method for using a map of IoT devices to selectively operate one or more of the IoT devices based on a user proximity thereto, according to some embodiments.

FIG. 10 illustrates a flow diagram of a method for generating a map of IoT devices that incorporates a floorplan, according to some embodiments.

FIG. 11 illustrates a flow diagram of a method for updating an ML model for generating a floorplan that is incorporated into a map of IoT devices, according to some embodiments.

FIG. 12 illustrates a flow diagram of a further method for enabling map-based management of a plurality of IoT devices, according to some embodiments

In the drawings, like reference numbers generally indicate identical or similar elements. Additionally, generally, the left-most digit(s) of a reference number identifies the drawing in which the reference number first appears.

DETAILED DESCRIPTION

Figure 1:
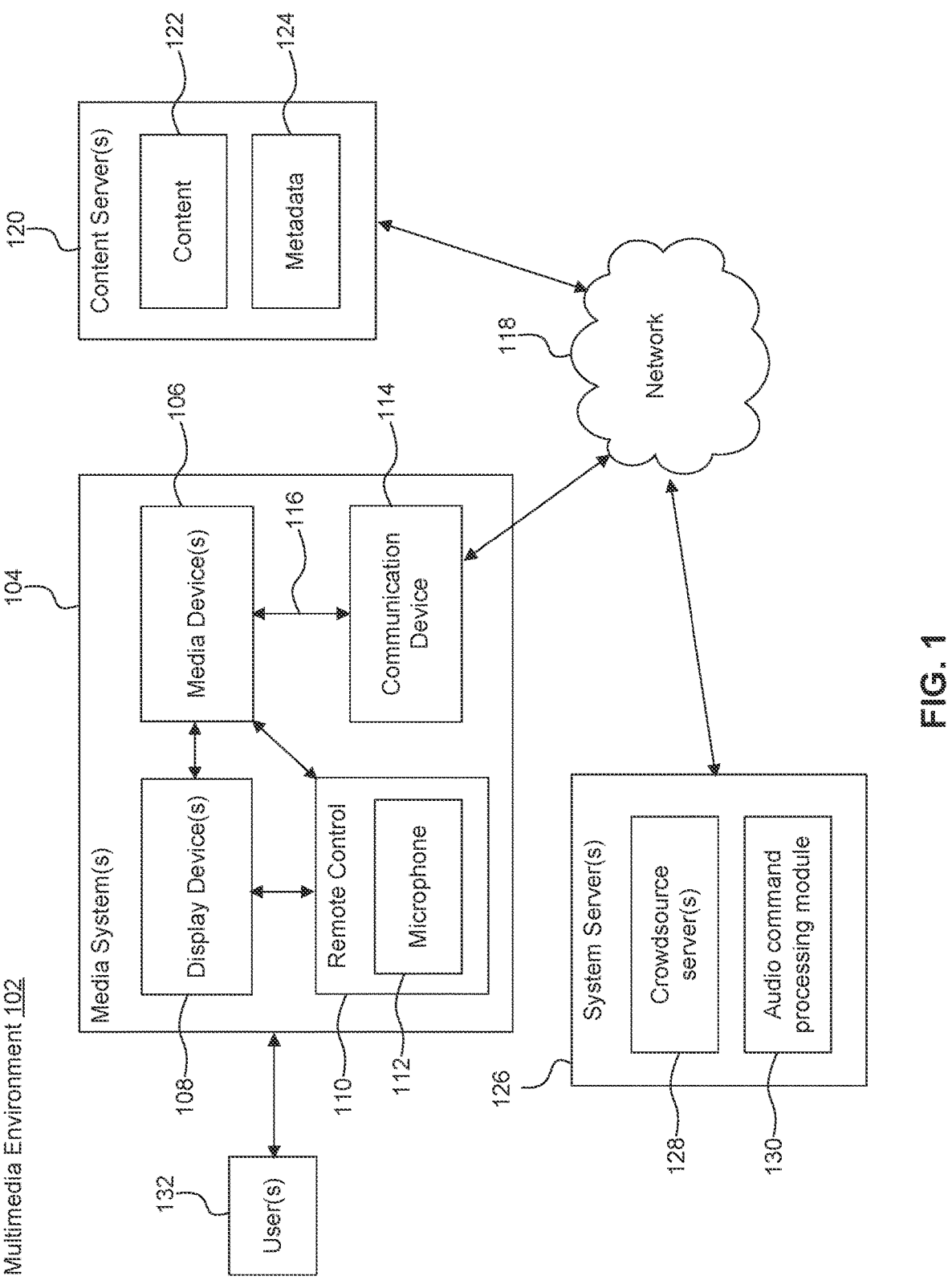
FIG. 1 illustrates a block diagram of a multimedia environment, according to some embodiments.

As discussed in the Background Section above, applications exist that enable users to control IoT devices installed on a premises, such as a home or office. Conventional IoT device control applications typically identify IoT devices by name and may enable a user to sort those devices by name or date added. However, in a scenario in which there are a large number of IoT devices (e.g., a large number of smart lightbulbs in a relatively small area), trying to individually control each one of those IoT devices using such an application can be difficult and confusing. For example, a user may know (and even be looking at) the IoT device he/she wants to control, but he/she may not recall the specific name that was assigned to the device or the date it was added and thus cannot easily identify it within the application.

Furthermore, such conventional IoT device control applications may not provide a capability, outside of perhaps user-assigned names (e.g., "Patio-lightbulb-6"), by which a user can determine where each IoT device is located within a home or other premises. This can make it difficult for the user to control or activate devices in a certain room or area of the home or other premises.

Still further, such conventional IoT device control applications may not provide a method by which a user thereof can determine which IoT devices are physically closest to him/her. This can make it difficult for the user to configure or operate IoT devices that are close to him/her without knowing the assigned names of those IoT devices.

Provided herein are system, apparatus, device, method and/or computer program product embodiments, and/or combinations and sub-combinations thereof, for generating a map that may be used to enable map-based management of a plurality of IoT devices present on a premises, thereby addressing one or more of the foregoing issues associated with conventional IoT device control applications. An example embodiment obtains first map-building data associated with a mobile device (e.g., a user's phone), the first map-building data including first positional data indicative of a relative position of the mobile device with respect to one or more subsets of the plurality of IoT devices at different points in time, and/or second map-building data from each of one or more IoT devices of the plurality of IoT devices, the second map-building data including second positional data indicative of a relative position of each of the one or more IoT device with respect to a subset of other IoT devices in the plurality of IoT devices. The example embodiment generates, based on at least the first map-building data and/or the second map-building data, a map (e.g., a two-dimensional (2D) map or a three-dimensional (3D) map) in which each of the IoT devices in the plurality of IoT devices is assigned a corresponding map location (e.g., one or more map coordinates). The example embodiment provides the map to an application that enables map-based management (e.g., identification, configuration, and/or operation) of the plurality of IoT devices.

For example, the application may be configured to display at least a portion of the map to the user so that the user can identify IoT devices by location within the map, rather than by name or date added. In certain embodiments, the application may enable the user to view the map from different perspectives (e.g., 2D vs. 3D, by floor, by inside vs. outside, by rotating the map, or by zooming in or out).

As another example, the application may be configured to determine a location of a user within the map, generate a list of IoT devices sorted by a proximity to the user based on the location of the user and the IoT devices within the map, and display the list to the user. This beneficially enables the user to easily identify the IoT devices that are closest to him/her.

As yet another example, the application may be configured to determine a location and orientation of a user within the map, generate, based on the determined location and orientation of the user within the map, a simulated user view that includes representations of selected ones of the IoT devices (e.g., the IoT devices that are within a field of view associated with the user), and display the simulated view to the user. In further accordance with such an embodiment, the representations of the IoT devices may be interactive, such that a user need only touch (or otherwise interact with) a given IoT device representation to identify, configure and/or operate the corresponding IoT device. Such an embodiment provides an easy and intuitive way for a user to control IoT devices that are near to them, without having to search for the IoT device in a list or remember what name was assigned to the IoT device.

As still another example, the application may be configured to determine a location of a user within the map, identify one or more of the IoT devices having a location within the map that is within a predetermined distance to the location of the user within the map, and, in response to the identifying, actuate an operation of the identified one or more IoT devices. Such an embodiment can advantageously leverage the map to automatically operate IoT devices based on user location within the premises (e.g., automatically turn on lights when the user walks into a room, automatically trigger an alarm when a person enters the home, etc.).

In embodiments, a mobile device (e.g., a user's smartphone) may be used to generate data for building the map. Such map-building data may be obtained, for example, by leveraging one or more wireless interfaces and/or sensors incorporated within the mobile device. Such map-building data may be collected organically over time as a user carries the mobile device around the premises. For example, the map-building data may include positional data that is indicative of a relative position of the mobile device with respect to different subsets of the plurality of IoT devices at different points in time. By way of example only, the positional data may comprise, for a given point in time, one or more of: received signal strength information for each IoT device in a subset of the plurality of IoT devices; time of flight information for each IoT device in the subset of the plurality of IoT devices; distance information for each IoT device in the subset of the plurality of IoT devices; bearing information for each IoT device in the subset of the plurality of IoT devices; an estimated position of the mobile device based on triangulation or trilateration with respect to the subset of the plurality of IoT devices; image data corresponding to the subset of the plurality of IoT devices; audio data corresponding to the subset of the plurality of IoT devices; LiDAR data corresponding to the subset of the plurality of IoT devices; or Wi-Fi sensing data corresponding to the subset of the plurality of IoT devices. The map-building data provided by the mobile device may also include one or more of a position of the mobile device as determined by a satellite-based positioning system or a position of the mobile device as determined by an indoor positioning system.

In a further embodiment, the IoT devices may be used to generate data for building the map. Such map-building data may be obtained, for example, by leveraging one or more wireless interfaces and/or sensors incorporated within the IoT devices. Such map-building data may be obtained, for example, each time an IoT device is installed on the premises, and/or periodically or intermittently over time. For example, map-building data may be obtained from each of one or more IoT devices of the plurality of IoT devices, wherein the map-building data includes positional data that is indicative of a relative position of each of the one or more IoT devices with respect to a subset of other IoT devices in the plurality of IoT devices. By way of example only, the positional data may comprise, for each of the one or more of the plurality of IoT devices, one or more of: received signal strength information for each IoT device in the subset of other IoT devices; time of flight information for each IoT device in the subset of other IoT devices; distance information for each IoT device in the subset of other IoT devices; bearing information for each IoT device in the subset of other IoT devices; an estimated position of the IoT device based on triangulation or trilateration with respect to the subset of other IoT devices; image data corresponding to the subset of other IoT devices; audio data corresponding to the subset of other IoT devices; radar data corresponding to the subset of other IoT devices; LiDAR data corresponding to the subset of other IoT devices; or Wi-Fi sensing data corresponding to the subset of other IoT devices. The map-building data provided by each of the one or more of the plurality of IoT devices may also include one or more of a position of the IoT device as determined by a satellite-based positioning system or a position of the IoT device as determined by an indoor positioning system.

In an embodiment, the map is generated by a machine learning (ML) model based at least on the aforementioned map-building data. In further accordance with such an embodiment, the application may include a map editor that enables a user thereof to modify a map location of at least one of the plurality of IoT devices. In still further accordance with such an embodiment, training data may be generated based at least on the modification and such training data may be used to update the ML model. Thus, in accordance with such an embodiment, edits to IoT device map locations input by any number of users may advantageously be used to improve the performance of the map-building ML model over time.

In an embodiment, generating the map includes generating a floorplan of the premises and incorporating the floorplan into the map. The floorplan may be generated, for example, based on data collected from the aforementioned mobile device and/or IoT devices, based on the determined locations of the IoT devices within the map, and/or based on other data. In an embodiment, the floorplan comprises a plurality of rooms and incorporating the floorplan into the map comprises selectively assigning different subsets of the plurality of IoT devices to different ones of the rooms. This feature advantageously enables room-based identification, configuration and operational control of the IoT devices.

In a further embodiment, the aforementioned floorplan is generated by an ML model. In further accordance with such an embodiment, the application may include a floorplan editor that enables a user thereof to modify a feature of the floorplan. In still further accordance with such an embodiment, training data may be generated based at least on the modification and such training data may be used to update the ML model. Thus, in accordance with such an embodiment, edits to floorplan features input by any number of users may advantageously be used to improve the performance of the floorplan-building ML model over time.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

Multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. Communication device 114 may include, for example, a cable modem or satellite TV transceiver. Media device 106 may communicate with communication device 114 over a link 116, wherein link 116 may include wireless (such as Wi-Fi) and/or wired connections.

In various embodiments, network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. Remote control 110 can be any component, part, apparatus and/or method for controlling media device 106 and/or display device 108, such as a remote control, a tablet, laptop computer, smartphone, wearable, on-screen controls, integrated control buttons, audio controls, or any combination thereof, to name just a few examples. In an embodiment, remote control 110 wirelessly communicates with media device 106 and/or display device 108 using cellular, Bluetooth, infrared, etc., or any combination thereof. Remote control 110 may include a microphone 112, which is further described below.

Multimedia environment 102 may include a plurality of content servers 120 (also called content providers, channels or sources 120). Although only one content server 120 is shown in FIG. 1, in practice multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to content 122. Metadata 124 may also or alternatively include one or more indexes of content 122, such as but not limited to a trick mode index.

Multimedia environment 102 may include one or more system servers 126. System servers 126 may operate to support media devices 106 from the cloud. It is noted that the structural and functional aspects of system servers 126 may wholly or partially exist in the same or different ones of system servers 126.

Media devices 106 may exist in thousands or millions of media systems 104. Accordingly, media devices 106 may lend themselves to crowdsourcing embodiments and, thus, system servers 126 may include one or more crowdsource servers 128.

For example, using information received from media devices 106 in the thousands and millions of media systems 104, crowdsource server(s) 128 may identify similarities and overlaps between closed captioning requests issued by different users 132 watching a particular movie. Based on such information, crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, crowdsource server(s) 128 may operate to cause closed captioning to be automatically turned on and/or off during future streamings of the movie.

System servers 126 may also include an audio command processing module 130. As noted above, remote control 110 may include microphone 112. Microphone 112 may receive audio data from users 132 (as well as other sources, such as the display device 108). In some embodiments, media device 106 may be audio responsive, and the audio data may represent verbal commands from user 132 to control media device 106 as well as other components in media system 104, such as display device 108.

In some embodiments, the audio data received by microphone 112 in remote control 110 is transferred to media device 106, which is then forwarded to audio command processing module 130 in system servers 126. Audio command processing module 130 may operate to process and analyze the received audio data to recognize user 132's verbal command. Audio command processing module 130 may then forward the verbal command back to media device 106 for processing.

Figure 2:
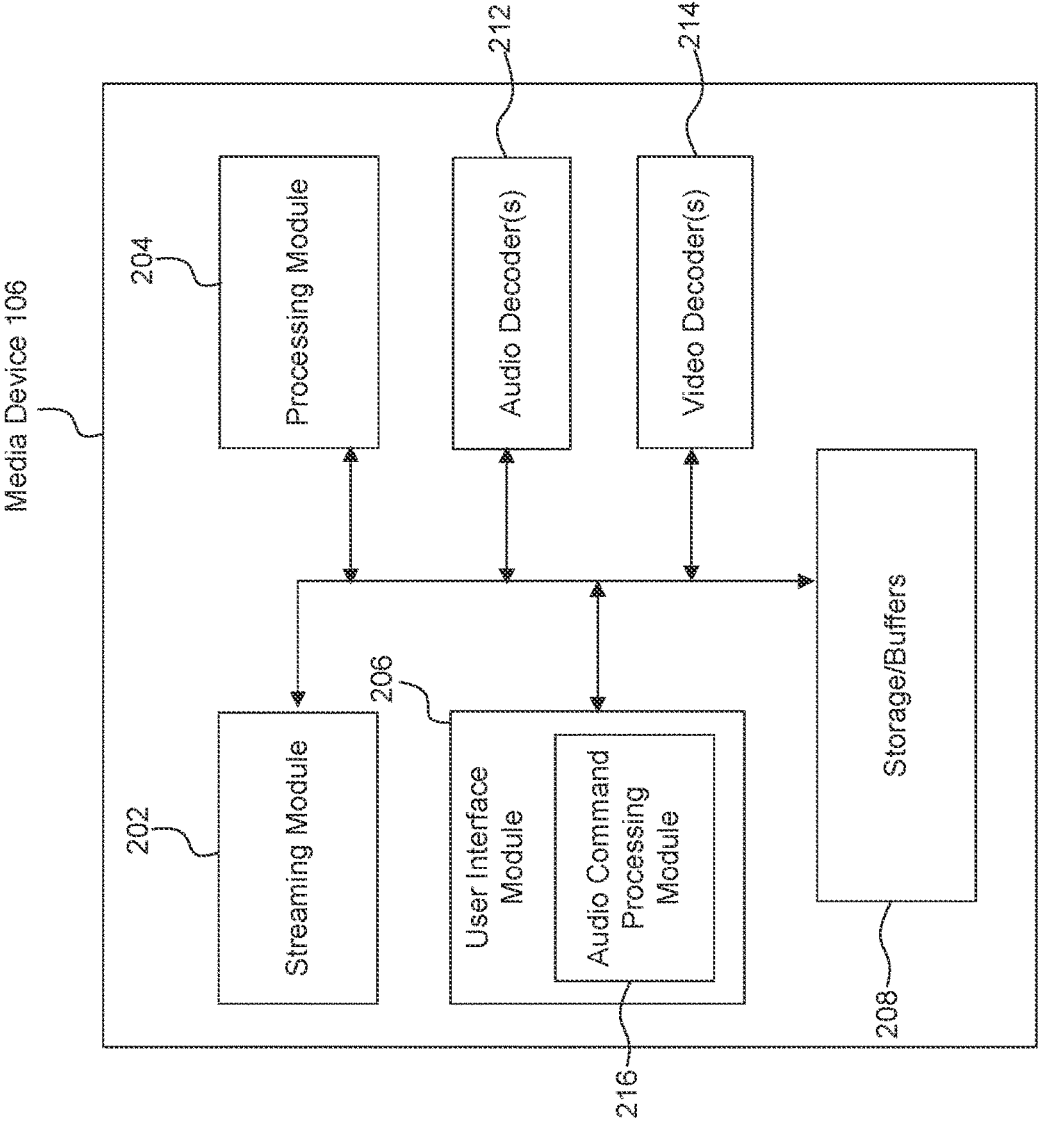
FIG. 2 illustrates a block diagram of a streaming media device, according to some embodiments.

In some embodiments, the audio data may be alternatively or additionally processed and analyzed by an audio command processing module 216 in media device 106 (see FIG. 2). Media device 106 and system servers 126 may then cooperate to pick one of the verbal commands to process (either the verbal command recognized by audio command processing module 130 in system servers 126, or the verbal command recognized by audio command processing module 216 in media device 106).

FIG. 2 illustrates a block diagram of an example media device 106, according to some embodiments. Media device 106 may include a streaming module 202, a processing module 204, storage/buffers 208, and a user interface module 206. As described above, user interface module 206 may include audio command processing module 216.

Media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAY, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, user 132 may interact with media device 106 via, for example, remote control 110. For example, user 132 may use remote control 110 to interact with user interface module 206 of media device 106 to select content, such as a movie, TV show, music, book, application, game, etc. Streaming module 202 of media device 106 may request the selected content from content server(s) 120 over network 118. Content server(s) 120 may transmit the requested content to streaming module 202. Media device 106 may transmit the received content to display device 108 for playback to user 132.

In streaming embodiments, streaming module 202 may transmit the content to display device 108 in real time or near real time as it receives such content from content server(s) 120. In non-streaming embodiments, media device 106 may store the content received from content server(s) 120 in storage/buffers 208 for later playback on display device 108.

Map Generation and Map-Based Device Management

Figure 3:
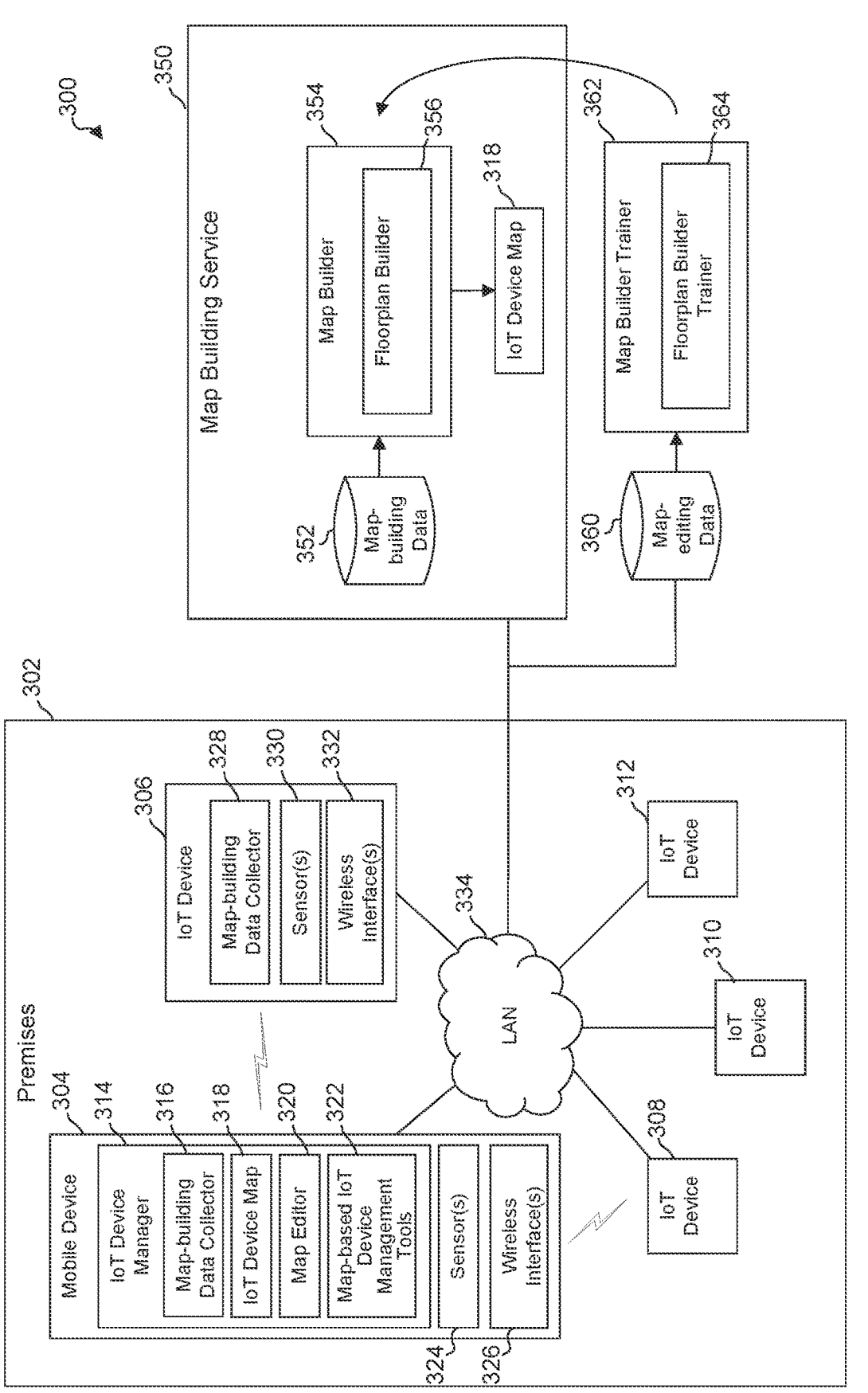
FIG. 3 illustrates a block diagram of a system for enabling map-based management of a plurality of IoT devices, according to some embodiments.

FIG. 3 illustrates a block diagram of a system 300 for enabling map-based management of a plurality of IoT devices, according to some embodiments. As shown in FIG. 3, system 300 includes a premises 302 in which a plurality of IoT devices 306, 308, 310 and 312 are present. Premises 302 may comprise, for example and without limitation, a home, an office, a building, a factory, a warehouse, a bar, a restaurant, a movie theater, a stadium, an auditorium, a car, a bus, a boat, or any other structure, location or space in which IoT devices may be present. Although only four IoT devices are shown as being present in premises 302 for the sake of illustration, it should be understood that premises 302 may include any number of IoT devices, including tens, hundreds or even thousands of IoT devices.

As used herein, the term "IoT device" is intended to broadly encompass any device that is capable of engaging in digital communication with another device. For example, a device that can digitally communicate with another device can comprise an IoT device, as that term is used herein, even if such communication does not occur over the Internet.

Each of IoT devices 306, 308, 310 and 312 may comprise a device such as, for example, a smart phone, a laptop computer, a notebook computer, a tablet computer, a netbook, a desktop computer, a video game console, a set-top box, or an OTT streaming media player. Furthermore, each of IoT devices 306, 308, 310 and 312 may comprise a so-called "smart home" device such as, for example, a smart lightbulb, a smart switch, a smart refrigerator, a smart washing machine, a smart dryer, a smart coffeemaker, a smart alarm clock, a smart smoke alarm, a smart carbon monoxide detector, a smart security sensor, a smart doorbell camera, a smart indoor or outdoor camera, a smart door lock, a smart thermostat, a smart plug, a smart television, a smart speaker, a smart remote controller, or a voice controller. Still further, each of IoT devices 306, 308, 310 and 312 may comprise a wearable device such as a watch, a fitness tracker, a health monitor, a smart pacemaker, or an extended reality headset. However, these are only examples and are not intended to be limiting.

IoT devices 306, 308, 310 and 312 may be communicatively connected to a local area network (LAN) 334 via a suitable wired and/or wireless connection. In an embodiment, LAN 334 is implemented using a hub-and-spoke or star topology. For example, in accordance with such an embodiment, each of IoT devices 306, 308, 310 and 312 may be connected to a router via a corresponding Ethernet cable, wireless access point (AP), or IoT device hub. The router may include a modem that enables the router to act as an interface between entities connected to LAN 334 and an external wide area network (WAN), such as the Internet. In an alternate embodiment, LAN 334 is implemented using a mesh network topology. For example, in accordance with such an embodiment, each of IoT devices 306, 308, 310, and 312 may be linked directly to the other three IoT devices such that it can communicate directly therewith without a router. However, these are examples only, and other techniques for implementing LAN 334 may be used.

As further shown in FIG. 3, IoT device 306 may comprise a map-building data collector 328, one or more sensors 330, and one or more wireless interfaces 332. Map-building data collector 328 is configured to collect data from which a map of the IoT devices present in premises 302 (represented in FIG. 3 as IoT device map 318) may be generated, as will be described in more detail herein. Map-building data collector 328 may be implemented as processing logic that can comprise hardware (e.g., circuitry, dedicated logic, programmable logic, microcode, etc.), software (e.g., instructions executing on a processing device), or a combination thereof.

Sensor(s) 330 may comprise one or more devices or systems for detecting and responding to (e.g., measuring, recording) objects and events in the physical environment of IoT device 306. By way of example only and without limitation, sensor(s) 330 may include one or more of a camera or other optical sensor, a microphone, a radar system, a LiDAR system, a Wi-Fi sensing system, a temperature sensor, a pressure sensor, a proximity sensor, an accelerometer, a gyroscope, a magnetometer, an infrared sensor, a gas sensor, or a smoke sensor.

Wireless interface(s) 332 comprise components suitable for enabling IoT device 306 to wirelessly communicate with other devices via a corresponding wireless protocol. Wireless interface(s) 332 may include, for example and without limitation, one or more of: a Wi-Fi interface that enables IoT device 306 to wirelessly communicate with an access point or other remote Wi-Fi-capable device according to one or more of the wireless network protocols based on the IEEE (Institute of Electrical and Electronics Engineers) 802.11 family of standards; a cellular interface that enables IoT device 306 to wirelessly communicate with remote devices via one or more cellular networks; a Bluetooth interface that enables IoT device to engage in short-range wireless communication with other Bluetooth-enabled devices; or a Zigbee interface that enables IoT device 306 to wirelessly communicate with other Zigbee-enabled devices.

Each of IoT devices 308, 310 and 312 may include similar components to those shown with respect to IoT device 306. Thus, for example, each of IoT device 308, 310 and 312 may include a map-building data collector, one or more sensors, and one or more wireless interfaces.

Mobile device 304 is intended to represent a device that may be carried or otherwise moved to different locations in premises 302. By way of example only and without limitation, mobile device 304 may comprise a smart phone, a laptop computer, a notebook computer, a tablet computer, a netbook, a handheld video game console, or a wearable device (e.g., smart watch, extended reality headset). Mobile device 304 may also comprise a robot or other device capable of self-locomotion through premises 302. In an embodiment in which multimedia environment 102 is present in premises 302, mobile device 304 may comprise remote control 110. Mobile device 304 includes an IoT device manager 314, one or more sensors 324, and one or more wireless interfaces 326.

IoT device manager 314 may be implemented as processing logic that can comprise hardware (e.g., circuitry, dedicated logic, programmable logic, microcode, etc.), software (e.g., instructions executing on a processing device), or a combination thereof. In one embodiment, IoT device manager 314 comprises an application that is executed by one or more processors of mobile device 304. IoT device manager 314 is configured to enable map-based management of IoT devices present in premises 302, including IoT devices 306, 308, 310 and 312. As shown in FIG. 3, IoT device manager 314 includes a map-building data collector 316, an IoT device map 318, a map editor 320, and map-based IoT device management tools 322.

Map-building data collector 316 is configured to collect data from which a map of the IoT devices present in premises 302 (represented in FIG. 3 as IoT device map 318) may be be generated, as will be described in more detail herein.

IoT device map 318 is a map of the IoT device present in premises 302, including IoT devices 306, 308, 310 and 312. IoT device map 318 may be, for example, a 2D or 3D map in which each IoT device present in premises 302 is assigned a corresponding map location (e.g., one or more coordinates within the 2D or 3D map). As will be discussed in more detail herein, IoT device map 318 may be generated (and updated) by a map building service 350, after which IoT device map 318 may be provided to or otherwise accessed by mobile device 304.

Map editor 320 comprises a functionality of IoT device manager 314 by which a user may selectively modify IoT device map 318. For example, in an embodiment, a user may interact with map editor 320 to modify a map location of at least one of IoT devices 306, 308, 310 and 312 within IoT device map 318. A user may modify the map location of an IoT device, for example, if the user perceives that the assigned location of the IoT device in IoT device map 318 is incorrect. Furthermore, in an embodiment in which IoT device map 318 comprises a floorplan of premises 302, a user may interact with map editor 320 to modify a feature of the floorplan. A user may modify a feature of the floorplan, for example, if the user perceives that the representation of the floorplan feature within IoT device map 318 is incorrect.

Map-based IoT device management tools 322 comprise functionalities of IoT device manager 314 that leverage IoT device map 318 to allow a user to conduct map-based identification, configuration and/or operation of IoT devices present in premises 302, such as IoT devices 306, 308, 310 and 312. For example, map-based IoT device management tools 322 may include a map viewer that is configured to display at least a portion of IoT device map 318 via a display associated with mobile device 304. Such a map viewer may enable a user to identify IoT devices by virtue of their location within IoT device map 318. In certain embodiments, the map viewer may enable the user to view IoT device map 318, or portions thereof, from different perspectives (e.g., 2D vs. 3D, by floor, by inside vs. outside, by rotating the map, or by zooming in or out). Examples of other functionalities that may be included within map-based IoT device management tools will be described elsewhere herein.

Sensor(s) 324 may comprise one or more devices or systems for detecting and responding to (e.g., measuring, recording) objects and events in the physical environment of mobile device 304. By way of example only and without limitation, sensor(s) 324 may include one or more of a camera or other optical sensor, a microphone, a LiDAR system, a Wi-Fi sensing system, a Global Positioning System (GPS) sensor, an accelerometer, a gyroscope, or a magnetometer.

Wireless interface(s) 326 comprise components suitable for enabling mobile device 304 to wirelessly communicate with other devices via a corresponding wireless protocol. Wireless interface(s) 326 may include, for example and without limitation, one or more of: a Wi-Fi interface that enables mobile device 304 to wirelessly communicate with an access point or other remote Wi-Fi-capable device according to one or more of the wireless network protocols based on the IEEE 802.11 family of standards; a cellular interface that enables mobile device 304 to wirelessly communicate with remote devices via one or more cellular networks; or a Bluetooth interface that enables mobile device 304 to engage in short-range wireless communication with other Bluetooth-enabled devices.

Although only a single mobile device 304 is shown in FIG. 3, it is to be understood that multiple mobile devices may be present in premises 302, and each such mobile device may be configured in a like manner to mobile device 304.

As further shown in FIG. 3, system 300 includes a map building service 350. Map building service 350 may be implemented as processing logic that can comprise hardware (e.g., circuitry, dedicated logic, programmable logic, microcode, etc.), software (e.g., instructions executing on a processing device), or a combination thereof. Map building service 350 may be implemented by a device (e.g., a server) that is remote from premises 302 but communicatively connected thereto (e.g., communicatively connected to LAN 334) via one or more networks. Alternatively, map building service 350 may be implemented by a device within premises 302, such as by mobile device 304, or one of IoT devices 306, 308, 310, 312. Still further, map building service 350 may be implemented in a distributed manner by two or more remotely-located and/or local devices.

Map building service 350 comprises a map builder 354. Map builder 354 is configured to receive map-building data 352 and, based at least thereon, generate IoT device map 318. Map-building data 352 may include data collected by map-building data collector 328 of IoT device 306, by map-building data collectors that may be included in each of IoT devices 308, 310 and 312 and other IoT devices present in premises 302, by map-building data collector 316 of mobile device 304, and by map-building data collectors that may be included in other mobile devices present in premises 302. Map-building data 352 may also include data collected from other sources.

In an embodiment, map builder 354 is implemented as an ML model. For example, map builder 354 may comprise a supervised ML model. In further accordance with such an example, map builder 354 may comprise a supervised deep learning ML model implemented using neural networks. However, these examples are not intended to be limiting and map builder 354 may be implemented using other types of ML models, or without ML (e.g., as a heuristic algorithm).

As shown in FIG. 3, map builder 354 may include a floorplan builder 356. Floorplan-builder 356 is configured to receive map-building data 352 and, based at least thereon, generate a floorplan of premises 302 that is incorporated into IoT device map 318. For example, the floorplan generated by floorplan builder 356 may comprise a plurality of rooms and incorporating the floorplan into IoT device map 318 may entail selectively assigning different subsets of the IoT devices to different ones of the rooms.

In an embodiment, floorplan builder 356 comprises a standalone ML model. For example, floorplan builder 356 may comprise a supervised ML model. In further accordance with such an example, floorplan builder 356 may comprise a supervised deep learning ML model implemented using neural networks. However, these examples are not intended to be limiting and floorplan builder 356 may be implemented using other types of ML models, or without ML (e.g., as a heuristic algorithm). In an alternate embodiment, floorplan builder 356 356 is part of a same ML model or algorithm that is used to implement map builder 354.

As discussed above, in embodiments, a user may utilize map editor 320 to modify IoT device map 318, wherein such modifications may include modifying a location of an IoT device within IoT device map 318 or modifying a feature of a floorplan that is incorporated into IoT device map 318. In further accordance with such embodiments, information concerning such modifications may be collected from mobile device 304, as well as from other devices that enable a user to modify an IoT device map (both within premises 302 and in other premises). This information is collectively represented in FIG. 3 as map-editing data 360. In an embodiment in which map builder 354 is implemented using a supervised ML model, map-editing data 360 may be used to generate training data that is provided to a map builder trainer 362 that updates the supervised ML model based on the training data. Likewise, in an embodiment in which floorplan builder 356 is implemented as a supervised ML model, map-editing data 360 may be used to generate training data that is provided to a floorplan builder trainer 364 that updates the supervised ML model based on the training data. Thus, in accordance with such embodiments, edits to IoT device maps or to floorplans features included therein made by any number of users may advantageously be used to improve the performance of map builder 354 and/or floorplan builder 356 over time.

Although IoT device manager 314 is shown as part of mobile device 304 in FIG. 3, it should be understood that additional instances of IoT device manager 314 may be implemented on other devices within premises 302, including on one or more of IoT devices 306, 308, 310 or 312. For example, in an embodiment in which multimedia environment 102 is present in premises 302, a media device 106 (e.g., an OTT streaming media device) may implement an instance of IoT device manager 314 (or certain portions thereof) and a user interface thereof may be displayed via a corresponding display device 108. As another example, a smart TV present in premises 302 may implement an instance of IoT device manager 314 (or certain portions thereof).

To further illustrate how system 300 enables map-based management of a plurality of IoT devices, FIG. 4 will now be described. In particular, FIG. 4 illustrates a process by which mobile device 304 and/or IoT devices 306, 308, 310 and 312 may be used to collect map-building data 352, according to some embodiments.

Figure 4:
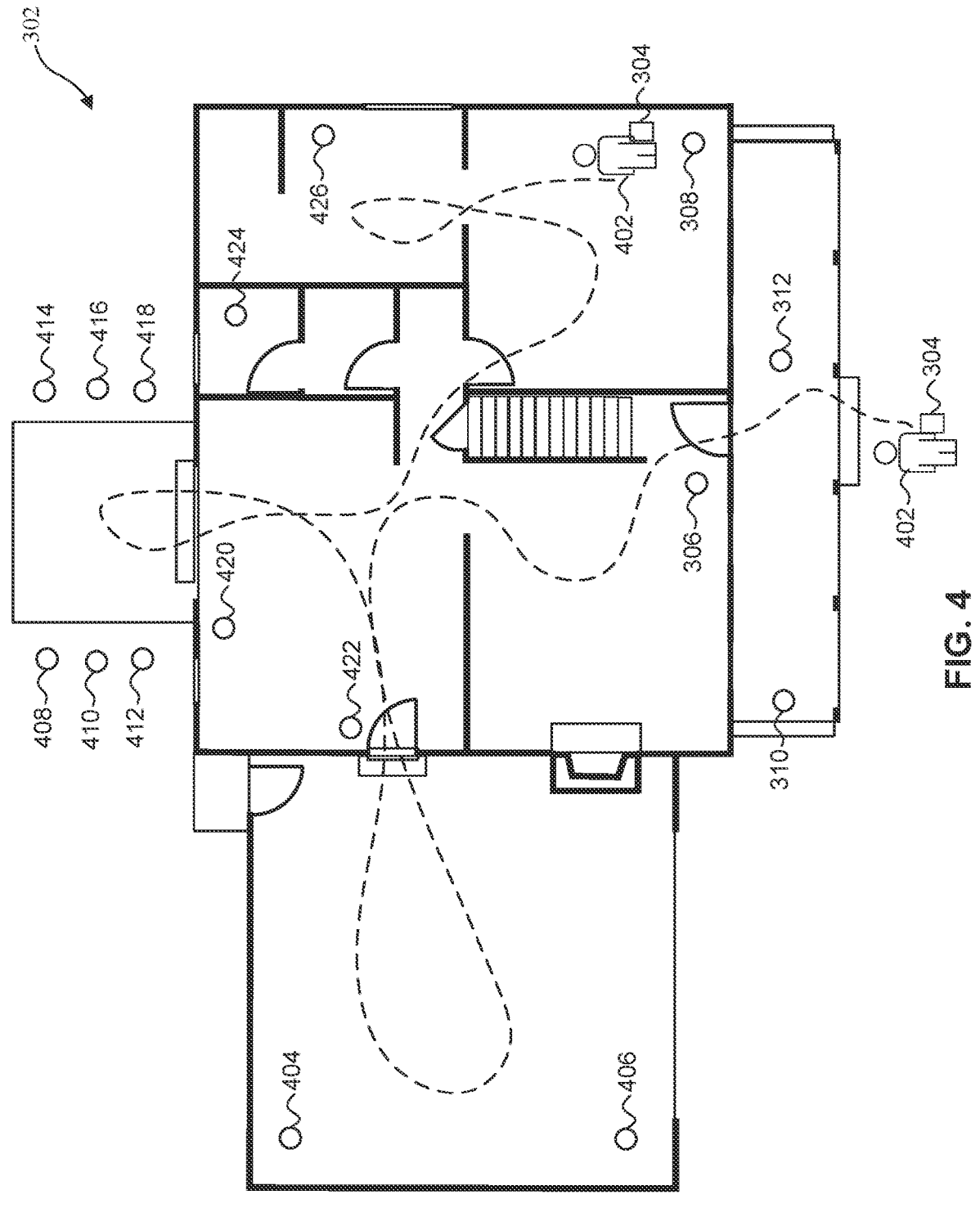
FIG. 4 illustrates a process of collecting map-building data by a mobile device and/or by one or more IoT devices, according to some embodiments.

In the example of FIG. 4, premises 302 includes a house or other structure comprising a plurality of rooms. A plurality of IoT devices are present in premises 302, both inside the structure and outside the structure (e.g., in a yard or other outdoor area associated with the structure). The plurality of IoT devices include IoT devices 306, 308, 310 and 312 as previously described in reference to FIG. 3 as well as additional IoT devices 404, 406, 408, 410, 412, 414, 416, 418, 420, 422, 424 and 426. Some or all of these IoT devices may include components similar to those shown for IoT device 306 in FIG. 3 (e.g., a map-building data collector, sensor(s) and wireless interface(s)).

As a user 402 carries mobile device 304 around premises 302 (as indicated by the dashed line in FIG. 4), map-building data collector 316 included therein may operate to collect map-building data on a substantially continuous, periodic or intermittent basis. For example, map-building data collector 316 may operate to obtain positional data that is indicative of a relative position of mobile device 304 with respect to the same subset or different subsets of the IoT devices at different points in time as user 402 traverses premises 302.

Map-building data collector 316 may leverage wireless interface(s) 326 to obtain such positional data. For example, in an embodiment, mobile device 304 may be capable of exchanging Wi-Fi signals with one or more of the IoT devices within premises 302. In further accordance with such an embodiment, mobile device 304 and one or more of the IoT devices within premises 302 may implement WI-FI AWARE™ technology that enables such devices to discover each other when within a suitable range and engage in Wi-Fi communication directly therewith. In further accordance with such an embodiment, mobile device 304 may be capable of deriving both distance and bearing information with respect to one or more IoT devices at a given point in time based, for example, on time-of-flight measurements obtained via Wi-FI communications with each such IoT device. Alternatively, the positional data may comprise the time-of-flight measurements themselves. In another embodiment, mobile device 304 may be capable of discovering one or more IoT devices in accordance with Bluetooth device discovery protocols and determining distance and bearing information with respect to those IoT device(s) at a given point in time based on Bluetooth communications therewith.

As another example, map-building data collector 316 may obtain the positional data by determining a received signal strength associated with wireless signals (e.g., Wi-Fi or Bluetooth signals) received from various IoT devices at a given point in time. Such received signal strength information may be used, for example, to estimate a distance to each of the IoT devices. In further accordance with such an example, the positional data may comprise the received signal strength information for the different IoT devices and/or the estimated distances thereto.

In a scenario in which map-building data collector 316 is capable of determining a distance, or distance and bearing, to three or more IoT devices at a given point in time, map-building data collector 316 may determine an estimated position of mobile device 304 based on triangulation or trilateration with respect to the IoT devices, and this estimated location may be provided as the positional data.

Map-building data collector 316 may also leverage sensors 324 to obtain the aforementioned positional data. For example, a camera included in mobile device 304 may be used to capture images that may be processed to identify one or more IoT devices that are within a field of view of the camera when the image was captured and to estimate a distance and bearing thereto. In further accordance with such an example, each IoT device within the field of view of the camera may be controlled to generate a visual indicator unique to that IoT device (e.g., a light of a particular color) at the time of image capture to help an image processor distinguish between the different IoT devices.

As another example, a microphone included in mobile device 304 may be used to capture audio data that may be processed to identify sounds emanating from one or more IoT devices and to estimate a distance thereto based, e.g., on a volume associated with each of those sounds. If multiple microphones are available, a bearing to each IoT device may also be determined based on the audio data. In further accordance with such an example, each such IoT device may be controlled to generate an audio indicator unique to that IoT device (e.g., a distinct sound) at the time of audio capture to help an audio processor distinguish between the different IoT devices.

As yet another example, map-building data collector 316 may use a LiDAR system within mobile device 304 to sense IoT devices proximal to mobile device 304 at a given point in time and to estimate a distance and bearing thereto. As still another example, map-building data collector 316 may use a Wi-Fi sensing system (i.e., a system that uses Wi-Fi signal reflections to sense people and objects) within mobile device 304 to sense IoT devices proximal to mobile device 304 at a given point in time and to estimate a distance and bearing thereto.

In an embodiment in which mobile device 304 includes a GPS sensor, map-building data collector 316 may include a GPS position of mobile device 304 at different points in time as part of the map-building data. In other embodiments, map-building data collector 316 may include a position of mobile device 304 as determined by some other satellite-based positioning system at different points in time as part of the map-building data. In yet another embodiment, map-building data collector 316 may include a position of mobile device 304 as determined by an indoor positioning system (e.g., a WLAN based positioning system) at different points in time as part of the map-building data.

In an embodiment in which mobile device 304 includes one or more motion sensors (e.g., gyroscope, accelerometer, and/or magnetometer), map-building data collector 316 may include motion sensor data obtained from mobile device 304 as part of the map-building data. For example, the motion sensor data obtained from mobile device 304 may include raw data or measurements generated by the motion sensor (s). Additionally or alternatively, the motion sensor data obtained from mobile device 304 may include an estimated position, orientation or movement property (e.g., trajectory, speed, and/or acceleration) of mobile device 304 as determined based on data generated by the motion sensor(s).

In a further embodiment, the IoT devices within premises 302 themselves may be used to generate map building data 352. For example, the IoT devices may be used to generate the aforementioned positional data associated with mobile device 304 based on wireless communication therewith. As another example, each IoT device may be used to generate positional data with respect to the other IoT devices present in premises 302.

For example, map-building data collector 328 within IoT device 306 may leverage wireless interface(s) 332 to generate positional data that is indicative of a relative position of IoT device 306 with respect to a subset of other IoT devices present in premises 302. For example, through the receipt of wireless signals from such other IoT devices or the exchange of wireless signals with such other IoT devices, map-building data collector 328 of IoT device 306 may determine positional data that comprises one or more of: received signal strength information for each IoT device in the subset of other IoT devices; time of flight information for each IoT device in the subset of other IoT devices; distance information for each IoT device in the subset of other IoT devices; bearing information for each IoT device in the subset of other IoT devices; or an estimated position of the IoT device based on triangulation or trilateration with respect to the subset of other IoT devices. Map-building data collector 328 may also include channel reliability information for each IoT device in the subset of other IoT devices in map building data 352.

Map-building data collector 328 within IoT device 306 may also leverage sensor(s) 330 to obtain map-building data 352. In particular, map-building data collector 328 may leverage sensor(s) 330 to generate positional data that is indicative of a relative position of IoT device 306 with respect to a subset of other IoT devices present in premises 302.

For example, a camera included in IoT device 306 may be used to capture images that may be processed to identify one or more other IoT devices that are within a field of view of the camera when the image was captured and to estimate a distance and bearing thereto. In further accordance with such an example, each IoT device within the field of view of the camera may be controlled to generate a visual indicator unique to that IoT device (e.g., a light of a particular color) at the time of image capture to help an image processor to distinguish between the different IoT devices.

As another example, a microphone included in IoT device 306 may be used to capture audio data that may be processed to identify sounds emanating from one or more other IoT devices and to estimate a distance thereto based, e.g., on a volume associated with each of those sounds. If multiple microphones are available, a bearing to each IoT device may also be determined based on the audio data. In further accordance with such an example, each such IoT device may be controlled to generate an audio indicator unique to that IoT device (e.g., a distinct sound) at the time of audio capture to help an audio processor distinguish between the different IoT devices.

As yet another example, map-building data collector 328 may use a LiDAR system within IoT device 306 to sense IoT devices proximal to IoT device 306 and to estimate a distance and bearing thereto. As still another example, map-building data collector 328 may use a radar system within IoT device 306 to sense IoT devices proximal to IoT device 306 and to estimate a distance and bearing thereto. As still another example, map-building data collector 328 may use a Wi-Fi sensing system (i.e., a system that uses Wi-Fi signal reflections to sense people and objects) within IoT device 306 to sense IoT devices proximal to IoT device 306 and to estimate a distance and bearing thereto.

In an embodiment in which IoT device 306 includes one or more motion sensors (e.g., gyroscope, accelerometer, and/or magnetometer), map-building data collector 328 may include motion sensor data obtained from IoT device 306 as part of the map-building data. For example, the motion sensor data obtained from IoT device 306 may include raw data or measurements generated by the motion sensor(s). Additionally or alternatively, the motion sensor data obtained from IoT device 306 may include an estimated position, orientation or movement property (e.g., trajectory, speed, and/or acceleration) of IoT device 306 as determined based on data generated by the motion sensor(s).

Thus, as discussed above, both mobile device 304 (and other mobile devices that traverse premises 302) and the IoT devices present in premises 302 may operate to collect map-building data 352. In an embodiment, an initial set of map-building data 352 may be obtained (e.g., from IoT devices only) and used to generate a first version of IoT device map 318. However, as more and more map-building data 352 is collected over time (e.g., by mobile devices carried through premises 302), such additional data may be provided to map builder 354 and map builder 354 may use such data to produce updated (e.g., more accurate) versions of IoT device map 318. Such updated versions of IoT device map 318 may be provided to IoT device manager 314 for use in providing map-based IoT device management.

FIG. 5 illustrates a flow diagram of a method 500 for enabling map-based management of a plurality of IoT devices, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 500 shall be described with reference to FIG. 3. However, method 500 is not limited to that example embodiment.

In 502, map-building data 352 associated with mobile device 304 is obtained from map-building data collector 316 and/or map-building data collector 328, wherein map-building data 352 including positional data that is indicative of a relative position of mobile device 304 with respect to one or more subsets of a plurality of IoT devices (e.g., IoT devices 306, 308, 310 and 312) at different points in time.

In 504, map builder 354 generates, based on at least map-building data 352, an IoT device map 318 in which each IoT device in the plurality of IoT devices (e.g., IoT devices 306, 308, 310 and 312) is assigned a corresponding map location (e.g., one or more map coordinates). IoT device map 318 may comprise, for example, a 2D map or a 3D map.

In 506, IoT device map 318 is provided to an application (e.g., IoT device manager 314) that enables map-based management of the plurality of IoT devices (e.g., IoT devices 306, 308, 310 and 312). Providing IoT device map 318 to the application may include, for example and without limitation, transmitting IoT device map 318 to mobile device 304 for storage thereby or storing IoT device map 318 remotely (e.g., on a server) and enabling the application to access (e.g., query) remotely-stored IoT device map 318.

In embodiments, the positional data referred to in 502 comprises, for a given point in time, one or more of: received signal strength information for each IoT device in a subset of the plurality of IoT devices; time of flight information for each IoT device in the subset of the plurality of IoT devices; distance information for each IoT device in the subset of the plurality of IoT devices; bearing information for each IoT device in the subset of the plurality of IoT devices; an estimated position of mobile device 304 based on triangulation or trilateration with respect to the subset of the plurality of IoT devices; image data corresponding to the subset of the plurality of IoT devices; audio data corresponding to the subset of the plurality of IoT devices; LiDAR data corresponding to the subset of the plurality of IoT devices; or Wi-Fi sensing data corresponding to the subset of the plurality of IoT devices.

In further embodiments, map building data 352 further includes, for a given point in time, one or more of: a position of mobile device 304 as determined by a satellite-based positioning system (e.g., GPS); a position of mobile device 304 as determined by an indoor positioning system; or motion sensor data obtained from mobile device 304.

FIG. 6 illustrates a flow diagram of a method 600 for updating an ML model for generating a map of IoT devices, according to some embodiments. Method 600 is relevant to an embodiment in which map builder 354 is implemented as a supervised ML model. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall be described with reference to FIG. 3. However, method 600 is not limited to that example embodiment.

In 602, map editor 320 modifies a map location of at least one of the plurality of IoT devices (e.g., at least one of IoT devices 306, 308, 310 and 312) in IoT device map 318 based on user input. In an embodiment, information about the modification is included as part of map-editing data 360.

In 604, map builder trainer 362 generates training data based at least on the modification (e.g., based at least on the information about the modification included in map-editing data 360).

In 606, map builder trainer 362 uses the training data to update the ML model (e.g., the supervised ML model used to implement map builder 354).

FIG. 7 illustrates a flow diagram of a method 700 for using a map of IoT devices to generate a list of the IoT devices sorted by proximity to a user, according to some embodiments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art.

Method 700 shall be described with reference to FIG. 3. However, method 700 is not limited to that example embodiment. In an embodiment, method 700 is performed by IoT device manager 314 as part of providing map-based IoT device management tools 322.

In 702, IoT device manager 314 determines a location of a user within IoT device map 318. For example, IoT device manager 314 may determine the location of the user within IoT device map 318 by determining a location of mobile device 304 within IoT device map 318, based on an assumption that mobile device 304 is being carried by the user. In this case, the location of mobile device 304 may be determined using any of the previously-described techniques for generating positional data associated with mobile device 304. However, this is only an example, and other techniques may be used to determine the location of the user within IoT device map 318.

In 704, IoT device manager 314 generates a list of two or more of the plurality of IoT devices (e.g., two or more of IoT devices 306, 308, 310 and 312) sorted by a proximity to the user based on the location of the user within IoT device map

318 and the locations of the two or more of the plurality of IoT devices within IoT device map 318. For example, IoT device manager 314 may determine a distance between the user and each IoT device within IoT device map 318, and then generate a list of the IoT devices sorted by shortest to longest distance.

In 706, IoT device manager 314 displays the list. For example, IoT device manager 314 may display the list in a user interface associated with IoT device manager 314. Such user interface may be displayed via a display device integrated with or connected to mobile device 304. The presentation of the list in this manner may beneficially enable the user to easily identify the IoT devices that are closest to them.

FIG. 8 illustrates a flow diagram of a method 800 for using a map of IoT devices to generate a simulated user view that includes representations of selected ones of the IoT devices, according to some embodiments. Method 800 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 8, as will be understood by a person of ordinary skill in the art.

Method 800 shall be described with reference to FIG. 3. However, method 800 is not limited to that example embodiment. In an embodiment, method 800 is performed by IoT device manager 314 as part of providing map-based IoT device management tools 322.

In 802, IoT device manager 314 determines a location and orientation of a user within IoT device map 318. For example, IoT device manager 314 may determine the location of the user within IoT device map 318 by determining a location of mobile device 304 within IoT device map 318, based on an assumption that mobile device 304 is being carried by the user. In this case, the location of mobile device 304 may be determined using any of the previously-described techniques for generating positional data associated with mobile device 304. However, this is only an example, and other techniques may be used to determine the location of the user within IoT device map 318.

In an embodiment, IoT device manager 314 determines an orientation of the user within IoT device map 318 by determining an orientation of mobile device 304 within IoT device map 318, based on an assumption that mobile device 304 is being held by the user. In this case, the orientation of mobile device 304 may be determined using one or more motion sensors (e.g., accelerometers, gyroscopes, magnetometers) included in mobile device 304. However, this is only an example, and other techniques may be used to determine the orientation of the user within IoT device map 318.

In 804, based on the location and orientation of the user within IoT device map 318, IoT device manager 314 generates a simulated user view that includes representations of selected ones of the plurality of IoT devices. For example, IoT device manager 314 may generate a simulated user view that includes representations of the IoT devices that are determined to be within a field of view associated with the user.

In 806, IoT device manager 314 displays the simulated view. For example, IoT device manager 314 may display the simulated view in a user interface associated with IoT device manager 314. Such user interface may be displayed via a display device integrated with or connected to mobile device 304. In an embodiment in which mobile device 304 comprises an extended reality headset, the simulated view may be rendered in augmented reality or virtual reality.

In an embodiment, the representations of the IoT devices in the aforementioned simulated view may be interactive, such that a user need only touch (or otherwise interact with) a given IoT device representation to identify, configure or operate the corresponding IoT device. An embodiment that implements method 800 can provide an easy and intuitive way for a user to control IoT devices that are near to them, without having to search for the IoT device in a list or remember what name was assigned to the IoT device.

FIG. 9 illustrates a flow diagram of a method 900 for using a map of IoT devices to selectively operate one or more of the IoT devices based on a user proximity thereto, according to some embodiments. Method 900 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 9, as will be understood by a person of ordinary skill in the art.

Method 900 shall be described with reference to FIG. 3. However, method 900 is not limited to that example embodiment. In an embodiment, method 900 is performed by IoT device manager 314 as part of providing map-based IoT device management tools 322.

In 902, IoT device manager 314 determines a location of a user within IoT device map 318. For example, IoT device manager 314 may determine the location of the user within IoT device map 318 by determining a location of mobile device 304 within IoT device map 318, based on an assumption that mobile device 304 is being carried by the user. In this case, the location of mobile device 304 may be determined using any of the previously-described techniques for generating positional data associated with mobile device 304. However, this is only an example, and other techniques may be used to determine the location of the user within IoT device map 318.

In 904, IoT device manager 314 identifies one or more IoT devices of the plurality of IoT devices (e.g., one or more of IoT devices 306, 308, 310 and 312) having a location within IoT device map 318 that is within a predetermined distance to the location of the user within IoT device map 318.

In 906, in response to the identifying in 904, IoT device manager 314 actuates an operation of the identified one or more IoT devices.

An embodiment that implements method 900 can advantageously leverage IoT device map 318 to automatically operate IoT devices (e.g., any or all of IoT devices 306, 308, 310 and 312) based on user location within premises 302 (e.g., automatically turn on lights when the user walks into a room, automatically trigger an alarm when a person enters the home, etc.).

FIG. 10 illustrates a flow diagram of a method 1000 for generating a map of IoT devices that incorporates a floorplan, according to some embodiments. Method 1000 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 10, as will be understood by a person of ordinary skill in the art.

Method 1000 shall be described with reference to FIG. 3. However, method 1000 is not limited to that example embodiment.

In 1002, floorplan builder 356 generates a floorplan of premises 302. In embodiments, floorplan builder 356 generates the floorplan based on map-building data 352, based on the determined locations of IoT devices (e.g., Iot devices 306, 308, 310 and 312) within IoT device map 318, and/or based on other data. In embodiments, floorplan builder 356 may generate the floorplan based on sensor data obtained by one or more of the IoT devices (e.g. images or scans of premises 302). In other embodiments, floorplan builder 356 may generate the floorplan based on publicly-available data associated with premises 302 (e.g., floorplan data published online by a real estate website), based on data collected by a robot (e.g., data collected by a robot vacuum that is configured to learn the floorplan of premises 302 over time), and/or based on other data obtained from other sources.

In 1004, map builder 354 incorporates the floorplan into IoT device map 318. In an embodiment in which the floorplan comprises a plurality of rooms, incorporating the floorplan into IoT device map 318 may comprise selectively assigning different subsets of the plurality of IoT devices to different ones of the rooms. Such a feature can advantageously enable room-based identification, configuration and operational control of the IoT devices.

FIG. 11 illustrates a flow diagram of a method 1100 for updating an ML model for generating a floorplan that is incorporated into a map of IoT devices, according to some embodiments. Method 1100 is relevant to an embodiment in which floorplan builder 356 is implemented as a supervised ML model. Method 1100 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 11, as will be understood by a person of ordinary skill in the art.

Method 1100 shall be described with reference to FIG. 3. However, method 1100 is not limited to that example embodiment.

In 1102, map editor 320 modifies a feature of the floorplan incorporated into IoT device map 318 based on user input. For example, map editor 320 may modify the placement and/or dimensions of a room, wall, door, staircase, tree or other space, structure or object included in the floorplan based on user input. As another example, map editor 320 may modify a name assigned to a room included in the floorplan based on user input. In an embodiment, information about the modification is included as part of map-editing data 360.

In 1104, floorplan builder trainer 364 generates training data based at least on the modification (e.g., based at least on the information about the modification of the feature of the floorplan included in map-editing data 360).

In 1106, floorplan builder trainer 364 uses the training data to update the ML model (e.g., the supervised ML model used to implement floorplan builder 356).

FIG. 12 illustrates a flow diagram of a further method 1200 for enabling map-based management of a plurality of IoT devices, according to some embodiments. Method 1200 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 12, as will be understood by a person of ordinary skill in the art.

Method 1200 shall be described with reference to FIG. 3. However, method 1200 is not limited to that example embodiment.

In 1202, map-building data 352 is obtained from each of one or more IoT devices of a plurality of IoT devices (e.g., IoT devices 306, 308, 310 and 312), wherein map-building data 352 includes positional data that is indicative of a relative position of each of the one or more IoT devices with respect to a subset of other IoT devices in the plurality of IoT devices.

In 1204, map builder 354 generates, based on at least map-building data 352, IoT device map 318 in which each of the IoT devices in the plurality of IoT devices is assigned a corresponding map location (e.g., one or more map coordinates). IoT device map 318 may comprise, for example, a 2D map or a 3D map.

In 1206, IoT device map 318 is provided to an application (e.g., IoT device manager 314) that enables map-based management of the plurality of IoT devices (e.g., IoT devices 306, 308, 310 and 312). Providing IoT device map 318 to the application may include, for example and without limitation, transmitting IoT device map 318 to mobile device 304 for storage thereby or storing IoT device map 318 remotely (e.g., on a server) and enabling the application to access (e.g., query) remotely-stored IoT device map 318.

In embodiments, the positional data referred to in 1202 comprises one or more of: received signal strength information for each IoT device in the subset of other IoT devices; time of flight information for each IoT device in the subset of other IoT devices; distance information for each IoT device in the subset of other IoT devices; bearing information for each IoT device in the subset of other IoT devices; an estimated position of the IoT device based on triangulation or trilateration with respect to the subset of other IoT devices; image data corresponding to the subset of other IoT devices; audio data corresponding to the subset of other IoT devices; radar data corresponding to the subset of other IoT devices; LiDAR data corresponding to the subset of other IoT devices; or Wi-Fi sensing data corresponding to the subset of other IoT devices.

In further embodiments, map building data 352 further includes one or more of: a position of the IoT device as determined by a satellite-based positioning system (e.g., GPS); a position of the IoT device as determined by an indoor positioning system; or motion sensor data obtained from the IoT device.

Example Computer System

Figure 13:
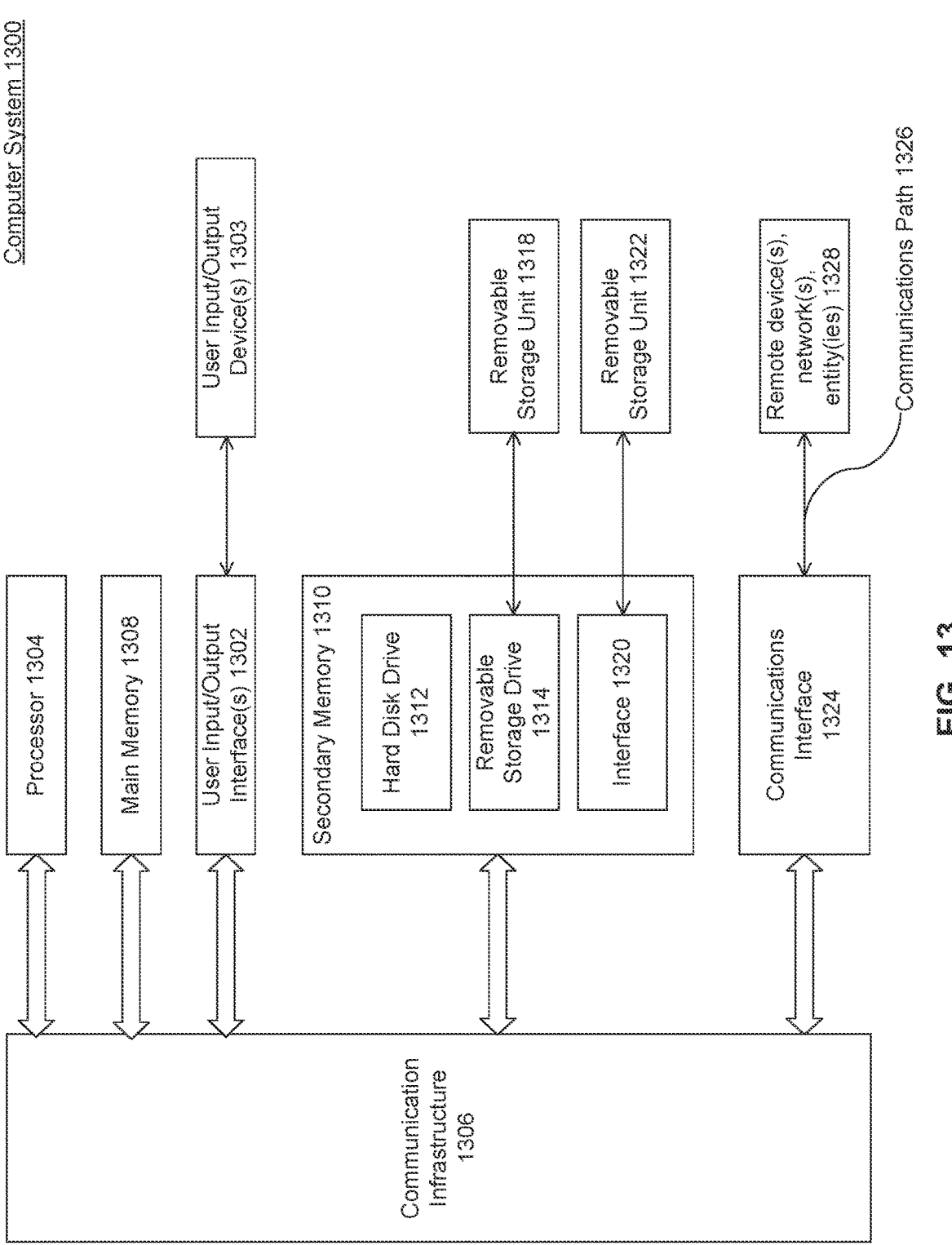
FIG. 13 illustrates an example computer system useful for implementing various embodiments.

Various embodiments may be implemented, for example, using one or more well-known computer systems, such as computer system 1300 shown in FIG. 13. For example, one or more of mobile device 304, IoT device 306, IoT device 308, IoT device 310, IoT device 312, map building service 350, or map builder trainer 362 may be implemented using combinations or sub-combinations of computer system 1300. Also or alternatively, one or more computer systems 1300 may be used, for example, to implement any of the embodiments discussed herein, as well as combinations and sub-combinations thereof.

Computer system 1300 may include one or more processors (also called central processing units, or CPUs), such as a processor 1304. Processor 1304 may be connected to a communication infrastructure or bus 1306.

Computer system 1300 may also include user input/output device(s) 1303, such as monitors, keyboards, pointing devices, etc., which may communicate with communication infrastructure 1306 through user input/output interface(s) 1302.

One or more of processors 1304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1300 may also include a main or primary memory 1308, such as random access memory (RAM). Main memory 1308 may include one or more levels of cache. Main memory 1308 may have stored therein control logic (i.e., computer software) and/or data.

Computer system 1300 may also include one or more secondary storage devices or memory 1310. Secondary memory 1310 may include, for example, a hard disk drive 1312 and/or a removable storage device or drive 1314. Removable storage drive 1314 may be a floppy disk drive, a magnetic tape drive, a compact disk drive, an optical storage device, tape backup device, and/or any other storage device/drive.

Removable storage drive 1314 may interact with a removable storage unit 1318. Removable storage unit 1318 may include a computer usable or readable storage device having stored thereon computer software (control logic) and/or data. Removable storage unit 1318 may be a floppy disk, magnetic tape, compact disk, DVD, optical storage disk, and/any other computer data storage device. Removable storage drive 1314 may read from and/or write to removable storage unit 1318.

Secondary memory 1310 may include other means, devices, components, instrumentalities or other approaches for allowing computer programs and/or other instructions and/or data to be accessed by computer system 1300. Such means, devices, components, instrumentalities or other approaches may include, for example, a removable storage unit 1322 and an interface 1320. Examples of the removable storage unit 1322 and the interface 1320 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 1300 may further include a communication or network interface 1324. Communication interface 1324 may enable computer system 1300 to communicate and interact with any combination of external devices, external networks, external entities, etc. (individually and collectively referenced by reference number 1328). For example, communication interface 1324 may allow computer system 1300 to communicate with external or remote devices 1328 over communications path 1326, which may be wired and/or wireless (or a combination thereof), and which may include any combination of LANs, WANs, the Internet, etc. Control logic and/or data may be transmitted to and from computer system 1300 via communication path 1326.

Computer system 1300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1300, main memory 1308, secondary memory 1310, and removable storage units 1318 and 1322, as well as tangible articles of manufacture embodying any combination of the foregoing. Such control logic, when executed by one or more data processing devices (such as computer system 1300 or processor(s) 1304), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 13. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for map-based management of a plurality of Internet of Things (IoT) devices present on a premises, comprising:

obtaining, by at least one computer processor, map-building data associated with a mobile device, the map-building data including positional data that is indicative of a relative position of the mobile device with respect to one or more subsets of the plurality of IoT devices at different points in time;

generating, based on at least the map-building data, a map in which each IoT device of the plurality of IoT devices is assigned a corresponding map location;

generating a list of two or more of the plurality of IoT devices based on the relative position of the mobile device with respect to the corresponding map locations of the two or more of the plurality of IoT devices; and providing the map and the list to an application that enables the map-based management of the plurality of IoT devices.

2. The computer-implemented method of claim 1, wherein the positional data comprises, for a given point in time, one or more of:

received signal strength information for each IoT device in a subset of the plurality of IoT devices;

time of flight information for each IoT device in the subset of the plurality of IoT devices;

distance information for each IoT device in the subset of the plurality of IoT devices;

bearing information for each IoT device in the subset of the plurality of IoT devices;

an estimated position of the mobile device based on triangulation or trilateration with respect to the subset of the plurality of IoT devices;

image data corresponding to the subset of the plurality of IoT devices;

audio data corresponding to the subset of the plurality of IoT devices;

LiDAR data corresponding to the subset of the plurality of IoT devices; or

Wi-Fi sensing data corresponding to the subset of the plurality of IoT devices.

3. The computer-implemented method of claim 1, wherein the map-building data further includes, for a given point in time, one or more of:

a position of the mobile device as determined by a satellite-based positioning system;

a position of the mobile device as determined by an indoor positioning system; or motion sensor data obtained from the mobile device.

4. The computer-implemented method of claim 1, wherein the map comprises one of a two-dimensional (2D) map or a three-dimensional (3D) map.

5. The computer-implemented method of claim 1, wherein the generating the map is performed by a machine-learning (ML) model, and wherein the computer-implemented method further comprises:

modifying a map location of at least one of the plurality of IoT devices based on user input;

generating training data based at least on the modification; and using the training data to update the ML model.

6. The computer-implemented method of claim 1, further comprising:

by the application:

displaying at least a portion of the map.

7. The computer-implemented method of claim 1, further comprising:

determining a location of a user within the map, wherein the list is sorted by a proximity to the user based on the location of the user within the map and the locations of the two or more of the plurality of IoT devices within the map; and displaying, by the application, the list.

8. The computer-implemented method of claim 1, further comprising:

by the application:

determining a location and orientation of a user within the map;

based on the location and orientation of the user within the map, generating a simulated user view that includes representations of selected ones of the plurality of IoT devices; and displaying the simulated view.

9. The computer-implemented method of claim 1, further comprising:

by the application:

determining a location of a user within the map;

identifying one or more IoT devices of the plurality of IoT devices having a location within the map that is within a predetermined distance to the location of the user within the map; and in response to the identifying, actuating an operation of the identified one or more IoT devices.

10. The computer-implemented method of claim 1, wherein the generating the map comprises:

generating a floorplan of the premises; and incorporating the floorplan into the map.

11. The computer-implemented method of claim 10, wherein the floorplan comprises a plurality of rooms and wherein incorporating the floorplan into the map comprises:

selectively assigning different subsets of the plurality of IoT devices to different ones of the plurality of rooms.

12. The computer-implemented method of claim 10, wherein the generating the floorplan is performed by a machine learning (ML) model and wherein the computer-implemented method further comprises:

modifying a feature of the floorplan based on user input;

generating training data based at least on the modification; and using the training data to update the ML model.

13. A system, comprising:

one or more memories; and at least one processor each coupled to at least one of the memories and configured to perform operations comprising:

obtaining map-building data from each of one or more Internet of Things (IoT) devices of a plurality of IoT devices present on a premises, the map-building data including positional data that is indicative of a relative position of each of the one or more IoT devices with respect to a subset of other IoT devices in the plurality of IoT devices;

generating, based on at least the map-building data, a map in which each of the IoT devices in the plurality of IoT devices is assigned a corresponding map location;

generating a list of two or more of the plurality of IoT devices based on the relative position of a mobile device with respect to corresponding map locations of the two or more of the plurality of IoT devices, and providing the map and the list to an application that enables map-based management of the plurality of IoT devices.

14. The system of claim 13, wherein the positional data comprises, for each of the one or more IoT devices of the plurality of IoT devices, one or more of:

received signal strength information for each IoT device in the subset of other IoT devices;

time of flight information for each IoT device in the subset of other IoT devices;

distance information for each IoT device in the subset of other IoT devices;

bearing information for each IoT device in the subset of other IoT devices;

an estimated position of IoT device based on triangulation or trilateration with respect to the subset of other IoT devices;

image data corresponding to the subset of other IoT devices;

audio data corresponding to the subset of other IoT devices;

radar data corresponding to the subset of other IoT devices;

LiDAR data corresponding to the subset of other IoT devices; or

Wi-Fi sensing data corresponding to the subset of other IoT devices.

15. The system of claim 13, wherein the map-building data further includes, for each of the one or more IoT devices of the plurality of IoT devices, one or more of:

a position of the IoT device as determined by a satellite-based positioning system;

a position of the IoT device as determined by an indoor positioning system; or motion sensor data obtained from the IoT device.

16. The system of claim 13, wherein the map comprises one of a two-dimensional (2D) map or a three-dimensional (3D) map.

17. The system of claim 13, wherein the generating the map is performed by a machine-learning (ML) model, and wherein the operations further comprise:

modifying a map location of at least one of the plurality of IoT devices based on user input;

generating training data based at least on the modification; and using the training data to update the ML model.

18. The system of claim 13, wherein the application is configured to display at least a portion of the map.

19. The system of claim 13, wherein generating the list further comprises:

determining a location of a user within the map;

wherein the list is sorted by a proximity to the user based on the location of the user within the map and the corresponding map locations of the two or more of the plurality of IoT devices within the map; and displaying the list.

20. The system of claim 13, wherein the application is configured to:

determine a location and orientation of a user within the map;

based on the location and orientation of the user within the map, generate a simulated user view that includes representations of selected ones of the plurality of IoT devices; and display the simulated view.

21. The system of claim 13, wherein the application is configured to:

determine a location of a user within the map;

identify one or more IoT devices of the plurality of IoT devices having a location within the map that is within a predetermined distance to the location of the user within the map; and in response to the identifying, actuate an operation of the identified one or more IoT devices.

22. The system of claim 13, wherein the generating the map comprises:

generating a floorplan of the premises; and incorporating the floorplan into the map.

23. The system of claim 22, wherein the floorplan comprises a plurality of rooms and wherein incorporating the floorplan into the map comprises:

selectively assigning different subsets of the plurality of IoT devices to different ones of the plurality of rooms.

24. The system of claim 22, wherein the generating the floorplan is performed by a machine learning (ML) model and wherein the operations further comprise:

modifying a feature of the floorplan based on user input;

generating training data based at least on the modification; and using the training data to update the ML model.

25. A non-transitory computer-readable medium having instructions stored thereon that, when executed by at least one computing device, cause the at least one computing device to perform operations comprising:

obtaining first map-building data associated with a mobile device, the first map-building data including first positional data that is indicative of a relative position of the mobile device with respect to one or more subsets of a plurality of Internet of Things (IoT) devices at different points in time;

obtaining second map-building data from each of one or more IoT devices of the plurality of IoT devices, the second map-building data including second positional data that is indicative of a relative position of each of the one or more IoT devices with respect to a subset of other IoT devices in the plurality of IoT devices;

generating, based on at least the first map-building data and the second map building data, a map in which each of the plurality of IoT devices is assigned a corresponding map location;

generating a list of two or more of the plurality of IoT devices based on the relative position of the mobile device with respect to the corresponding map locations of the two or more of the plurality of IoT devices; and providing the map and the list to an application that enables map-based management of the plurality of IoT devices.

* * * * *